(12) United States Patent
Rickers

(10) Patent No.: US 7,137,473 B2
(45) Date of Patent: Nov. 21, 2006

(54) FOUR-WHEEL INDUSTRIAL TRUCK WITH A SWING AXLE

(75) Inventor: Paul Rickers, Norderstedt (DE)

(73) Assignee: Jungheinrich Aktiengesellschaft (DE)

( * ) Notice: Subject to any disclaimer, the term of this patent is extended or adjusted under 35 U.S.C. 154(b) by 292 days.

(21) Appl. No.: 10/725,242

(22) Filed: Dec. 1, 2003

(65) Prior Publication Data

US 2004/0108663 A1    Jun. 10, 2004

(30) Foreign Application Priority Data

Dec. 4, 2002  (DE) .............................. 102 56 539

(51) Int. Cl.
*B60K 28/14* (2006.01)
(52) U.S. Cl. ...................... 180/282; 180/285
(58) Field of Classification Search ................ 180/282, 180/283, 285; 280/6.154, 124.111, 124.106, 280/755, 754, 763.1, 764.1, 765.1, 766.1; 340/440
See application file for complete search history.

(56) References Cited

U.S. PATENT DOCUMENTS

| | | | | |
|---|---|---|---|---|
| 4,262,177 A | * | 4/1981 | Paxton et al. | 200/61.45 R |
| 4,364,449 A | * | 12/1982 | Knight et al. | 180/271 |
| 5,931,499 A | * | 8/1999 | Sutherland | 280/755 |
| 5,997,013 A | * | 12/1999 | Claxton | 280/6.154 |
| 6,065,558 A | * | 5/2000 | Wielenga | 180/282 |
| 6,152,252 A | * | 11/2000 | Pettersson | 180/282 |
| 6,179,304 B1 | * | 1/2001 | Ishikawa et al. | 280/5.508 |
| 6,272,420 B1 | * | 8/2001 | Schramm et al. | 701/72 |
| 6,302,419 B1 | * | 10/2001 | Ito | 280/124.111 |
| 6,321,141 B1 | * | 11/2001 | Leimbach | 701/1 |
| 6,324,446 B1 | * | 11/2001 | Brown et al. | 701/1 |
| 6,591,932 B1 | * | 7/2003 | Drummond et al. | 180/282 |
| 6,938,716 B1 | * | 9/2005 | Eull | 180/282 |

FOREIGN PATENT DOCUMENTS

| | | |
|---|---|---|
| DE | 199 19 655 A1 | 5/2002 |
| DE | 101 18 442 A1 | 10/2002 |
| EP | 0 483 493 A2 | 7/1993 |
| EP | 0 796 749 A2 | 9/1997 |
| WO | 79/00330 | 6/1979 |

\* cited by examiner

*Primary Examiner*—David R. Dunn
*Assistant Examiner*—Drew J. Brown
(74) *Attorney, Agent, or Firm*—Peter J. Bilinski

(57) ABSTRACT

A four-wheel industrial truck with a swing axle for the rear wheels, a drive, and a control device for said drive that generates an actuating signal for the drive in response to a transducer signal. A stop is provided on the bodywork of the industrial truck that cooperates with the body of the swing axle, wherein a switch is arranged on the axle stop and the switch is coupled to the control device so as to reduce the drive torque of the drive when the switch is actuated.

4 Claims, 1 Drawing Sheet

FOUR-WHEEL INDUSTRIAL TRUCK WITH A SWING AXLE

CROSS-REFERENCE TO RELATED APPLICATIONS

This is application claims priority to German Patent Application No. 102 56 539.2, filed on Dec. 4, 2002, the content of which is relied upon and incorporated herein by reference in its entirety, and the benefit of priority under 35 U.S.C. §119 is hereby claimed.

BACKGROUND OF THE INVENTION

1. Field of the Invention

The invention relates to a four-wheel industrial truck with a swing axle.

2. Technical Background

When narrow curves are cornered the lateral moment of tilt which results from the centrifugal force may become larger for such vehicles than is the righting moment, and the vehicle topples over. It has become known from EP 0 483 493 to provide an alerting device for the industrial truck that includes a monitoring device for the condition of load. The load moment acting on the vehicle and the actual constellation of the vehicle are sensed. Unstable conditions are determined by means of this data and are signaled to the driver.

It is known from EP 0 796 749 to block the swing axle when unstability is impending. Such blockage is dependent on the angular velocity rate sensed or calculated for the vehicle.

It has become known from DE 101 18 442 A1 to provide a sensor, preferably on the vehicle frame or bodywork, which senses the distance of the vehicle frame from the swing axle. When this distance reaches a predetermined lower or predetermined upper value a relevant correction or alerting signal is produced. When a sensor is arranged on either side of the swing axle the threshold of response is formed by a lower distance value each. Additionally, the document has it made known to provide another sensor on the vehicle frame, preferably adjacent to the front axles, that measures the distance of the frame from the underlying ground.

When the ambient conditions are satisfactory a distance measurement of the type described can be readily performed by means of non-contacting optical, inductive or acoustic sensors. An industrial truck, when in operation, is subjected to harsh conditions. Therefore, sensors of the type described are exposed to hazards and there is a danger of a message not being made in case of impending unstability.

It has become known from WO 79/00330 to detect the inclination of a pole relative to the underlying ground by the use of a load-carrying means, e.g. with the aid of a potentiometer. The driver is signaled the angle measured and the driver of the industrial truck will be able to correct the position of the load-carrying means by tilting the pole accordingly. DE 199 19 655 A1 further has made it known for an industrial truck to associate at least one wheel with a load sensor. A safety device has a comparing facility which provides a signal to an alerting signal transmitter when one or more of the loads measured on a wheel fall below a predetermined value. This is intended to recognize an unstability or an approach to an unstability of the vehicle on time in order to counteract it. The sensor signals can act upon one or more functions of an industrial truck, namely on the height of load, steering angle, speed of the vehicle, pole inclination, shift of the load-carrying means in the direction of the longitudinal axis or also transversely thereto, height adjustment of one or more shock absorbers or the like. Further, a stabilizing device may be provided and may be activated accordingly.

SUMMARY OF THE INVENTION

The present invention provides a four-wheel industrial truck with a swing axle where tilting is prevented with a large certainty.

Vehicles including a swing axle have a so-called axle stop on their bodywork or frame on opposed sides of the axle. When a relevant inclination of the bodywork occurs relative to the axle the outer stop in cornering comes to bear against the axle body, preventing the bodywork from continuing to be swivelled with respect to the axle. This provides a certain safety from a tilting motion. Commonly, the axle stop is arranged so as to make the vehicle tilt in cornering only when the tilting moment becomes larger than the one which causes the axle stop to abut against the axle body. This fact is utilized by the invention. The axle stop has provided therein a switch which is actuated when the axle stop touches the axle body. The switch sends a signal to the drive control device which, as a result, will reduce the driving torque. In this way, a provision is made to eliminate the circumstances leading to unstability.

According to another aspect, a rotary pulse generator is arranged in the plane of rotation of the swing axle that is coupled to the control device so as to reduce the driving torque of the drive when the signal of the rotary pulse generator reaches a predetermined value. A rotary pulse generator of this type can be accommodated to be protected adjacent to the swing axle and is not restricted or impeded in its function by the harsh operation of the industrial truck.

It is known to equip four-wheel industrial trucks with two driven wheels. Further, it is known to couple each driven wheel to a driving motor of its own. In the invention, the design of the control device is such that, upon reception of a switch signal or signal from the rotary pulse generator, the drive each for the outer wheel in cornering is reduced in its torque. It is unnecessary to trigger the drive of the inner wheel in cornering because this hardly contributes to traction in the area close to unstability.

It is known to equip industrial trucks with a brake, e.g. a brake mechanism which is integrated in the driving motor. According to the invention, a braking torque can be additionally applied to the industrial truck, apart from influencing the driving torque, to counteract the unstable condition even more intensely. When the brake control device triggers each driven wheel separately it is possible to trigger the braking device of the outer wheel in cornering in case that an unstable condition is approaching. By the way, the braking torque may also be produced by an electric motor, when operated as a generator.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

The invention will be described in more detail below with reference to an embodiment shown in the drawings.

DETAILED DESCRIPTION

Figure 1:
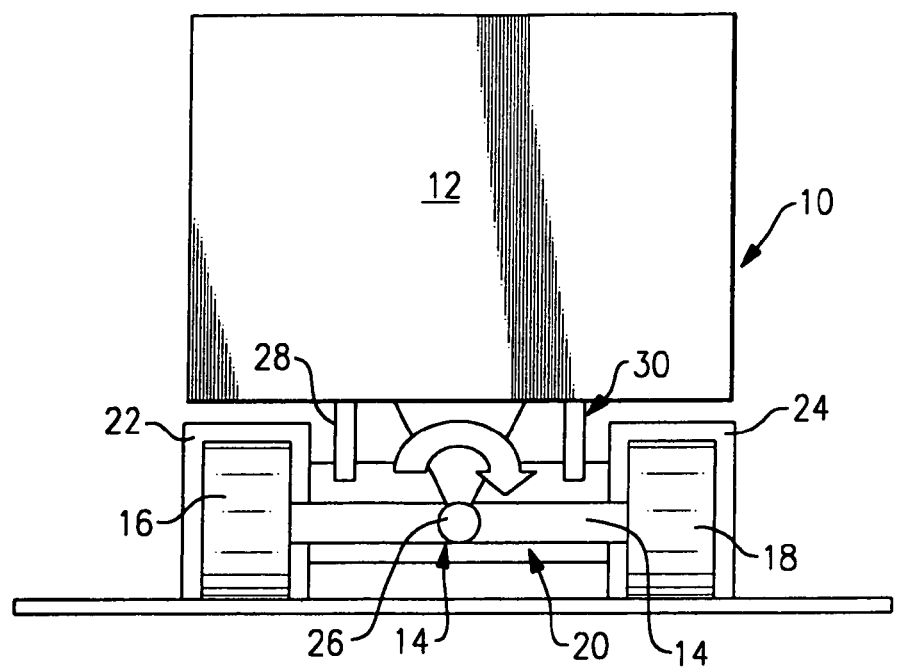
FIG. 1 Schematically shows the end view of a four-wheel industrial truck with a swing axle during a straight-ahead travel.
Figure 2:
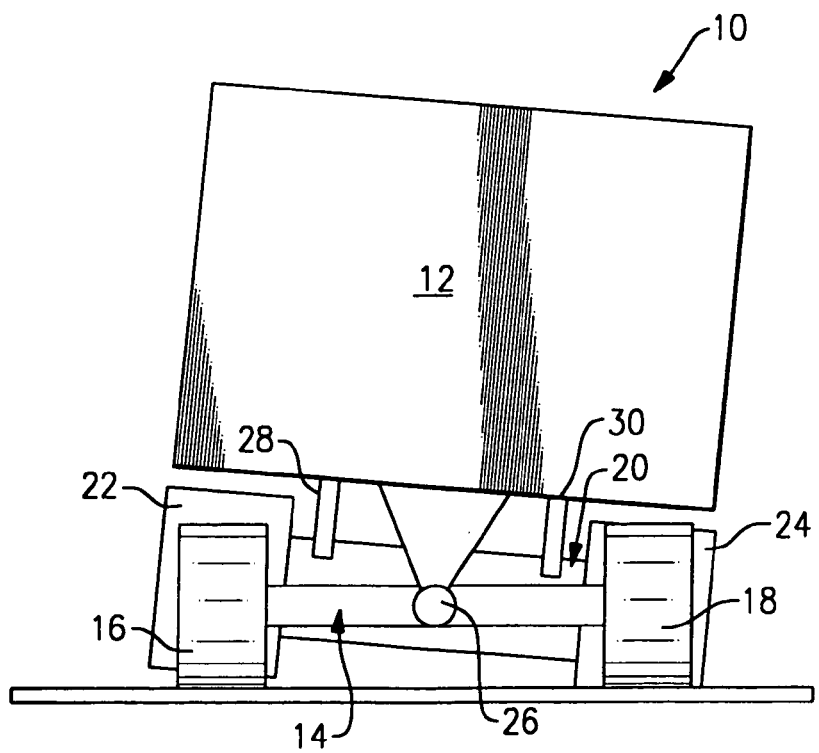
FIG. 2 shows the same view as FIG. 1, but with the bodywork inclined as a result of cornering.

Referring to FIGS. 1 and 2, an industrial truck 10 is schematically shown having a bodywork 12, a swing axle 14 with the respective wheels 16, 18, and a front axle 20 with driven front wheels 22, 24. A self-aligning bearing can be seen at 26.

Axle stops 28, 30 are mounted on the bodywork 12 on the two sides of the self-aligning bearing 26. When in a straight-ahead travel as shown in FIG. 1, the axle stops 28, 30 are at a distance from the swing axle 14. When the bodywork 12 inclines to one side as is shown in FIG. 2 while a narrow curve is cornered one of the two stops comes into contact with the swing axle 14 if a certain inclination angle is exceeded. Commonly, the design of the vehicle is such that if a stop touches the swing axle the unstable condition is not reached yet, but an even higher centrifugal force would rather be required to reach the unstable condition although the inner wheel in cornering is lifting off the underlying ground already as is shown in FIG. 2.

The axle stops 28, 30 have mounted thereon switches which are not shown and are actuated when the respective axle stop comes into contact with the axle body. The switches are connected to a control, which is not shown, for the drive of the wheels 22, 24, which is not shown, to cause a reduction of the driving torque of the driving motor when one of the switches responds. If each wheel 22, 24 is driven by a separate driving motor the driving torque will solely be reduced by the driving motor for the outer wheel in cornering, which is the wheel 24 here, to avoid reaching the unstable condition.

Likewise, it is imaginable to associate a rotary pulse generator, which measures the inclination of the bodywork 12 relative to the swing axle 14 and provides an appropriate signal to the control of the drive, in the area of the self-aligning bearing 26. Additionally, the signal of the rotary pulse generator or the signals of the switches, which are not shown, can be provided to a brake control in order to produce a braking signal when the unstable condition is approaching, which causes the stable condition of the vehicle to be restored rapidly.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A four-wheel industrial truck with a swing axle for the rear wheels, a drive, and a control device for said drive that generates an actuating signal for the drive in response to a generator signal wherein a stop is provided on the bodywork of the industrial truck that cooperates with the body of the swing axle and a switch is arranged on the axle stop, the switch being coupled to the control device so as to reduce the drive torque of the drive when the switch is actuated through contact with the body of said swing axle.

2. The four-wheel industrial truck according to claim 1, wherein the industrial truck has a driving motor for each driven wheel, wherein the control device reduces the drive torque of that driving motor which drives the outer wheel each in cornering.

3. The four-wheel industrial truck according to claim 2, wherein the industrial truck has a braking device controlled by a brake control device, wherein the signal of at least one switch and rotary pulse generator is provided to the brake control device such that a braking torque is generated when the switch responds or the signal of the rotary pulse generator reaches a predetermined value.

4. The four-wheel industrial truck according to claim 3, wherein the brakable wheels can be triggered separately by the brake control device and the brake control device brakes the outer wheel each in concerning when it receives a signal from the switch or rotary pulse generator.

* * * * *